United States Patent
Paleta, Jr. et al.

(10) Patent No.: US 9,893,417 B2
(45) Date of Patent: Feb. 13, 2018

(54) SATELLITE COMMUNICATIONS TERMINAL FOR A SHIP AND ASSOCIATED METHODS

(71) Applicant: SPEEDCAST INTERNATIONAL LTD, Botany Ot (AU)

(72) Inventors: Roy J. Paleta, Jr., Melbourne, FL (US); Duncan McCoig, Aberdeen (GB); Colin Strachan, Aberdeenshire (GB); Andrew Lucas, Aberdeen (GB); Stuart Alexander Cossar, Aberdeen (GB); William Robertson Dunbar, Aberdeenshire (GB)

(73) Assignee: SPEEDCAST INTERNATIONAL LIMITED, Botany (AU)

( * ) Notice: Subject to any disclaimer, the term of this patent is extended or adjusted under 35 U.S.C. 154(b) by 433 days.

(21) Appl. No.: 14/627,421

(22) Filed: Feb. 20, 2015

(65) Prior Publication Data

US 2016/0226136 A1 Aug. 4, 2016

Related U.S. Application Data

(63) Continuation-in-part of application No. 14/625,085, filed on Feb. 18, 2015, now Pat. No. 9,685,712, which
(Continued)

(51) Int. Cl.
*H01Q 1/34* (2006.01)
*H01Q 3/08* (2006.01)
(Continued)

(52) U.S. Cl.
CPC .............. *H01Q 1/34* (2013.01); *H01Q 1/42* (2013.01); *H01Q 3/02* (2013.01); *H01Q 3/08* (2013.01); *H01Q 5/00* (2013.01); *H01Q 19/13* (2013.01); *H01Q 19/19* (2013.01); *H01Q 21/28* (2013.01); *H04B 1/0053* (2013.01);
(Continued)

(58) Field of Classification Search
CPC ............ H01Q 1/34; H01Q 1/42; H01Q 1/125; H01Q 3/02; H01Q 3/04; H01Q 3/08; H01Q 19/13; H01Q 19/19; H01Q 5/00; H01Q 21/28; H04B 7/18513; H04B 7/18517;
(Continued)

(56) References Cited

U.S. PATENT DOCUMENTS 5,373,302 A 12/1994 Wu
5,507,025 A * 4/1996 Rodeffer ................ H03D 7/161
   348/726
(Continued)

*Primary Examiner* — Chuong P Nguyen
(74) *Attorney, Agent, or Firm* — Allen, Dyer, Doppelt+Gilchrist, P.A.

(57) ABSTRACT

A satellite communications terminal for a ship may include an antenna with three antenna feeds operable at respective different frequencies, and communications circuitry coupled to the three antenna feeds and being configurable for a selected antenna feed. The terminal also includes a positioner to mount the antenna to the ship and point the antenna. A controller may select an antenna feed, configure the communications circuitry, and operate the positioner to point the antenna to a selected satellite all based upon the location of the ship and at least one selection rule. The selection rule may be a communications circuitry configuration rule and/or a service level agreement rule.

40 Claims, 13 Drawing Sheets

Related U.S. Application Data is a continuation-in-part of application No. 14/608,790, filed on Jan. 29, 2015.

(51) Int. Cl.

| | | |
|---|---|---|
| *H01Q 5/00* | (2015.01) |
| *H01Q 19/13* | (2006.01) |
| *H01Q 19/19* | (2006.01) |
| *H01Q 21/28* | (2006.01) |
| *H01Q 1/42* | (2006.01) |
| *H01Q 3/02* | (2006.01) |
| *H04B 1/00* | (2006.01) |
| *H04B 7/185* | (2006.01) |
| *H04L 29/08* | (2006.01) |
| *H01Q 1/12* | (2006.01) |
| *H01Q 1/18* | (2006.01) |
| *H01Q 13/02* | (2006.01) |
| *H01Q 13/08* | (2006.01) |
| *H01Q 15/00* | (2006.01) |

(52) U.S. Cl.
CPC ..... *H04B 7/18513* (2013.01); *H04B 7/18517* (2013.01); *H04L 67/12* (2013.01); *H01Q 1/125* (2013.01); *H01Q 1/18* (2013.01); *H01Q 13/0208* (2013.01); *H01Q 13/0258* (2013.01); *H01Q 13/08* (2013.01); *H01Q 15/0013* (2013.01)

(58) Field of Classification Search
CPC ....... H04B 1/0053; G01S 19/13; G01S 19/14; G01S 19/24; G01S 19/36
USPC .... 342/359, 357.51, 357.63, 357.76, 357.52, 342/385; 343/709, 757, 761, 781
See application file for complete search history.

(56) References Cited

U.S. PATENT DOCUMENTS

| | | | | |
|---|---|---|---|---|
| 5,818,396 A | * | 10/1998 | Anderson | H01Q 13/02 333/126 |
| 6,137,451 A | * | 10/2000 | Durvasula | H01Q 15/147 343/779 |
| 6,317,093 B1 | * | 11/2001 | Harris | G01S 3/38 343/765 |
| 6,512,485 B2 | * | 1/2003 | Luly | H01Q 19/132 343/753 |
| 6,864,846 B2 | * | 3/2005 | King | H01Q 1/125 343/713 |
| 6,982,679 B2 | | 1/2006 | Kralovec et al. | |
| 8,334,815 B2 | * | 12/2012 | Monte | H01Q 1/288 343/762 |
| 8,497,810 B2 | | 7/2013 | Kits Van Heyningen et al. | |
| 8,514,140 B1 | | 8/2013 | Rao et al. | |
| 8,768,242 B2 | | 7/2014 | Frost et al. | |
| 9,628,169 B2 | * | 4/2017 | Park | H01Q 1/288 |
| 2002/0028654 A1 | | 3/2002 | Gleyzes et al. | |
| 2004/0066347 A1 | | 4/2004 | Schiff | |
| 2005/0207375 A1 | | 9/2005 | Schiff | |
| 2006/0040612 A1 | | 2/2006 | Min | |
| 2007/0259619 A1 | * | 11/2007 | Beadle | H04B 7/18513 455/12.1 |
| 2008/0298298 A1 | * | 12/2008 | Eom | H01Q 1/3275 370/316 |
| 2009/0022088 A1 | | 1/2009 | Wahlberg et al. | |
| 2011/0068988 A1 | | 3/2011 | Monte | |
| 2011/0171901 A1 | * | 7/2011 | Wyler | H01Q 1/1257 455/9 |
| 2011/0175781 A1 | * | 7/2011 | Kim | H01Q 23/08 343/766 |
| 2011/0205136 A1 | | 8/2011 | Runyon et al. | |
| 2011/0217976 A1 | | 9/2011 | Kaplan et al. | |
| 2012/0001816 A1 | | 1/2012 | Blaney | |
| 2013/0077562 A1 | | 3/2013 | Boltz et al. | |
| 2013/0295841 A1 | | 11/2013 | Choi et al. | |
| 2014/0139386 A1 | | 5/2014 | Liu et al. | |
| 2014/0250469 A1 | * | 9/2014 | Locatori | H04B 7/18595 725/68 |
| 2015/0022406 A1 | * | 1/2015 | Ling | H01Q 21/28 343/727 |
| 2016/0226151 A1 | * | 8/2016 | Paleta, Jr. | H01Q 19/19 |
| 2016/0226153 A1 | * | 8/2016 | Paleta, Jr. | H01Q 19/191 |

* cited by examiner

SATELLITE COMMUNICATIONS TERMINAL FOR A SHIP AND ASSOCIATED METHODS

RELATED APPLICATION

The present application is a continuation-in-part of U.S. patent application Ser. No. 14/625,085, filed on Feb. 18, 2015, which is a continuation-in-part of U.S. patent application Ser. No. 14/608,790, filed on Jan. 29, 2015, the entire disclosures of each of which is incorporated by reference herein.

FIELD OF THE INVENTION

The present invention relates to the field of wireless communications, and more particularly, to a satellite communications terminal for a ship, and related methods.

BACKGROUND

When ships travel across large bodies of water, such as the ocean, they rely on satellite communications to maintain contact on shore. Satellites typically operate over multiple frequency bands, such as C-band and Ku-band, for example. The C-band provides a larger coverage area than the Ku-band. Since the Ku-band operates at a higher frequency than the C-band, shorter wavelength signals are used. Consequently, the Ku-band provides spot beam coverage.

Ships generally include a multi-band satellite antenna assembly that operates over the C-band and the Ku-band. When an oil and gas exploration ship, rig, vessel or other device floating on water (herein referred to as a ship) is operating in the Gulf of Mexico, for example, the multi-band satellite antenna assembly is typically configured to operate in the Ku-band. The Ku-band may be preferred since operating costs are generally lower as compared to operating in the C-band. When the oil and gas exploration ship is traveling across the ocean to the North Sea, for example, the availability of the Ku-band is limited. Consequently, the multi-band satellite antenna assembly is configured to operate in the C-band.

In some embodiments, the multi-band satellite antenna assembly may not simultaneously support both C-band and Ku-band and needs to be manually configured for the desired frequency band. This requires the ship to be at port, and the reconfiguration can be a time consuming and costly process. In other embodiments, the multi-band satellite antenna assembly may simultaneously support both C-band and Ku-band so that manual reconfiguration is not required.

Continued growth and demand for bandwidth has led to new commercial satellite constellations at higher frequency. The O3b satellite constellation is a next generation of satellites that operate in the Ka-band. The Ka-band satellites are deployed in a medium earth orbit as compared to a geosynchronous orbit used by C-band/Ku-band satellite constellations. An advantage of a medium earth orbit is that latency times for voice and data communications are significantly reduced.

There are several multi-band satellite antenna assemblies that support Ku-band and Ka-band but not C-band. For example, U.S. Pat. No. 8,497,810 to Kits van Heyningen et al. discloses an antenna assembly implemented as a multi-beam, multi-band antenna having a main reflector with multiple feed horns and a subreflector having a reflective surface defining an image focus for a Ka-band signal and a prime focus for a Ku-band frequency signal. U.S. Pat. No. 8,334,815 to Monte et al. discloses an antenna assembly implemented as a multi-beam, multi-feed antenna having a primary reflector fitted with a dual mode feed tube and a switchable low noise feed block (LNB) that supports both Ka-band and Ku-band reception.

U.S. published patent application no. 2013/0295841 to Choi et al. discloses a satellite communication system between a source and a destination over multiple satellite communications paths. The satellite communication system first identifies the link performance established in multiple spectrums, then it performs a link comparison among the multiple spectrums (e.g., C-, Ku-, or Ka-Band) so as to determine a spectrum link that provides the highest throughput within an acceptable reliability criteria. The satellite communication system switches among the multiple spectrum links to provide the determined spectrum link between the source and the destination.

When a ship has potential access to multiple satellite networks, a determination may need to be made on which satellite network to select. Satellite network selection may be based upon a number of factors. In some instances, to reconfigure to a satellite network, changes to the antenna and associated circuitry have been made manually, and, typically when the ship is at a desired port.

SUMMARY

The embodiments disclosed herein are directed to a satellite communications terminal for a ship. The terminal may include an antenna comprising three antenna feeds operable at respective different frequencies, communications circuitry coupled to the three antenna feeds and being configurable for a selected antenna feed, and a positioner to mount the antenna to the ship and point the antenna. The terminal may also include a controller to select an antenna feed, configure the communications circuitry, and operate the positioner to point the antenna to a selected satellite all based upon the location of the ship and at least one selection rule. The controller comprises a processor and a memory coupled thereto, for example.

The at least one selection rule may comprise at least one of a communications circuitry configuration rule and a service level agreement rule. In somewhat different terms, the at least one selection rule may be based upon at least one of communication speed, communication latency, and communication cost.

The controller may store antenna pointing data for different satellite footprints and different ship locations. The controller may also operate the positioner according to the antenna pointing data. The satellites may be geostationary or non-geostationary.

The controller may select the antenna feed, configure the communications circuitry, and operate the positioner also based upon at least one of a communications circuitry status, and a time-of-day. Of course, time-of-day is relevant to non-geostationary satellites.

The controller and the antenna advantageously allows for seamless roaming across different satellite types, including geostationary and non-geostationary. The controller may select the appropriate frequency band, for example, depending on location of the ship, frequency band availability, topology and application.

The controller may comprise a remote override interface to permit a remote station to override at least one of selection of the antenna feed, configuration of the communications circuitry, and pointing of the antenna. In other words, although the terminal is generally autonomous, in some circumstances it may be desirable to override the satellite network being used at the ship.

In some embodiments, the antenna may comprise a main reflector cooperating with the three antenna feeds, and a subreflector spaced from the main reflector. For example, three antenna feeds may be operable at the Ka band, Ku band, and C band, respectively.

The communications circuitry may comprise a first transmitter and receiver pair associated with the first antenna feed, a second transmitter and receiver pair associated with the second antenna feed, and a third transmitter and receiver pair associated with the third antenna feed. The circuitry may also comprise a first modem associated with the first transmitter and receiver pair, a second modem associated with the second transmitter and receiver pair, and a third modem associated with the third transmitter and receiver pair. The different modems may be operable with different selectable configurations, for example. In addition, the communications circuitry may comprise a router associated with the first, second and third modems.

For some shipboard applications, the positioner may comprise a stabilization platform. A radome may also be provided to surround the antenna.

A method aspect is for operating a satellite communications terminal for a ship as described above. That is, the terminal may comprise an antenna comprising three antenna feeds operable at respective different frequencies, communications circuitry coupled to the three antenna feeds and being configurable for a selected antenna feed, and a positioner to mount the antenna to the ship and point the antenna. Accordingly, the method may comprise operating a controller to select an antenna feed, configure the communications circuitry, and operate the positioner to point the antenna to a selected satellite all based upon the location of the ship and at least one selection rule.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
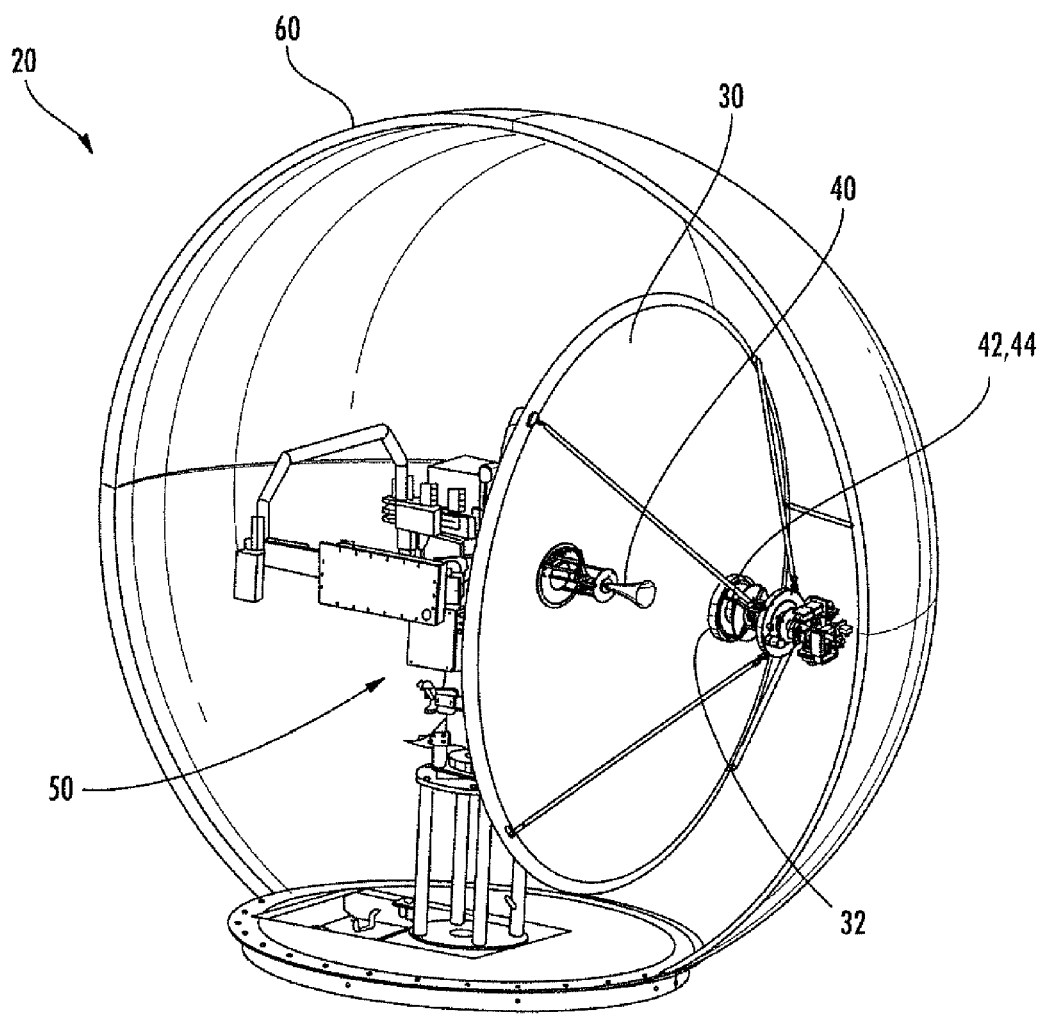
FIG. 1 is a perspective view of a satellite antenna assembly with three antenna feeds in accordance with the present invention.

Referring initially to FIG. 1, a satellite antenna assembly 20 with three antenna feeds will be discussed. The antenna assembly 20 includes a main reflector 30 and a subreflector 32 spaced from the main reflector. The subreflector 32 includes a frequency selective surface (FSS) material that is reflective for a first frequency band and transmissive for both a second frequency band and a third frequency band.

A first antenna feed 40 is adjacent the main reflector 30 and is directed toward the subreflector 32. The first antenna feed 40 is for the first frequency band. Second and third antenna feeds 42, 44 are arranged in a coaxial relationship and are directed toward the main reflector 30 with the subreflector 32 therebetween. The second and third antenna feeds 42, 44 are for the second and third frequencies, respectively.

In the illustrated embodiment, the first frequency band is the Ka-band, the second frequency band is the Ku-band, and the third frequency band is the C-band. The first, second and third antenna feeds 40, 42, 44 may be simultaneously operable. Since selection of anyone of the three antenna feeds 40, 42, 44 may be done on the fly, this avoids the need for manually reconfiguring the antenna assembly to a desired frequency band. The satellite antenna assembly 20 is not limited to these frequency bands. As readily appreciated by those skilled in the art, anyone of the antenna feeds 40, 42, 44 may be configured to operate at a different frequency band. In fact, a fourth frequency band could be added to the satellite antenna assembly 20.

The satellite antenna assembly 20 includes a stabilization platform 50 coupled to the main reflector 30. The stabilization platform 50 moves the main reflector 30 based on a desired azimuth and elevation. The stabilization platform 50 also maintains the main reflector 30 in the desired azimuth and elevation, such as in a shipboard application, as will be appreciated by those skilled in the art. The main reflector 30 is sized based on the operating frequencies of the antenna feeds, and typically has a diameter in a range of 2 to 3 meters, for example. A radome 60 covers the main reflector 30 and the subreflector 32. The radome 60 is configured to be compatible with the first, second and third frequency bands. The illustrated radome 60 is shown partially cut-away to more clearly illustrate positioning of the main reflector 30 and the subreflector 32, as well as the first, second and third antenna feeds 40, 42, 44.

Incorporating three antenna feeds 40, 42, 44 within the satellite antenna assembly 20 advantageously allows re-use of existing volume and mounting infrastructure already allocated for antenna assemblies operating with two antenna feeds. The three antenna feeds 40, 42, 44 also advantageously allow for additional bandwidth to be supported by the satellite antenna assembly 20. This may be important for ships, as well as for land-based remote satellite terminals, for example, where installation space and accessibility may be limited. Each of the first, second and third antenna feeds may be operable for both transmit and receive.

The first, second and third antenna feeds 40, 42, 44 may be simultaneously operable. Since selection of anyone of the three antenna feeds may be done on the fly, this may avoid the need for manually reconfiguring the antenna assembly to a desired frequency band.

The main reflector 30 has a medial opening therein, and the first antenna feed 40 is configured as an antenna feed horn extending through the medial opening. The first antenna feed 40 is arranged in a Cassegrain configuration since it is aimed at the subreflector 32 that is reflective to the first frequency band.

As noted above, the subreflector 32 includes a FSS material that is reflective for the first frequency band (i.e., first antenna feed 40) and is transmissive for both the second frequency band (i.e., second antenna feed 42) and the third frequency band (i.e., third antenna feed 44). For the first frequency band corresponding to the Ka-band, the FSS material is reflective to 17-29 GHz, where the receive frequency is 17-19.5 GHz and the transmit frequency is 27-29 GHz. For the second frequency band corresponding to the Ku-band, the FSS material is transmissive to 10-14.5 GHz, where the receive frequency is 10-12 GHz and the transmit frequency is 13.7-14.5 GHz. For the third frequency band corresponding to the C-band, the FSS material is transmissive to 3.9-6.5 GHz, where the receive frequency is 3.9-4.2 GHz and the transmit frequency is 5.9-6.5 GHz.

Figure 2:
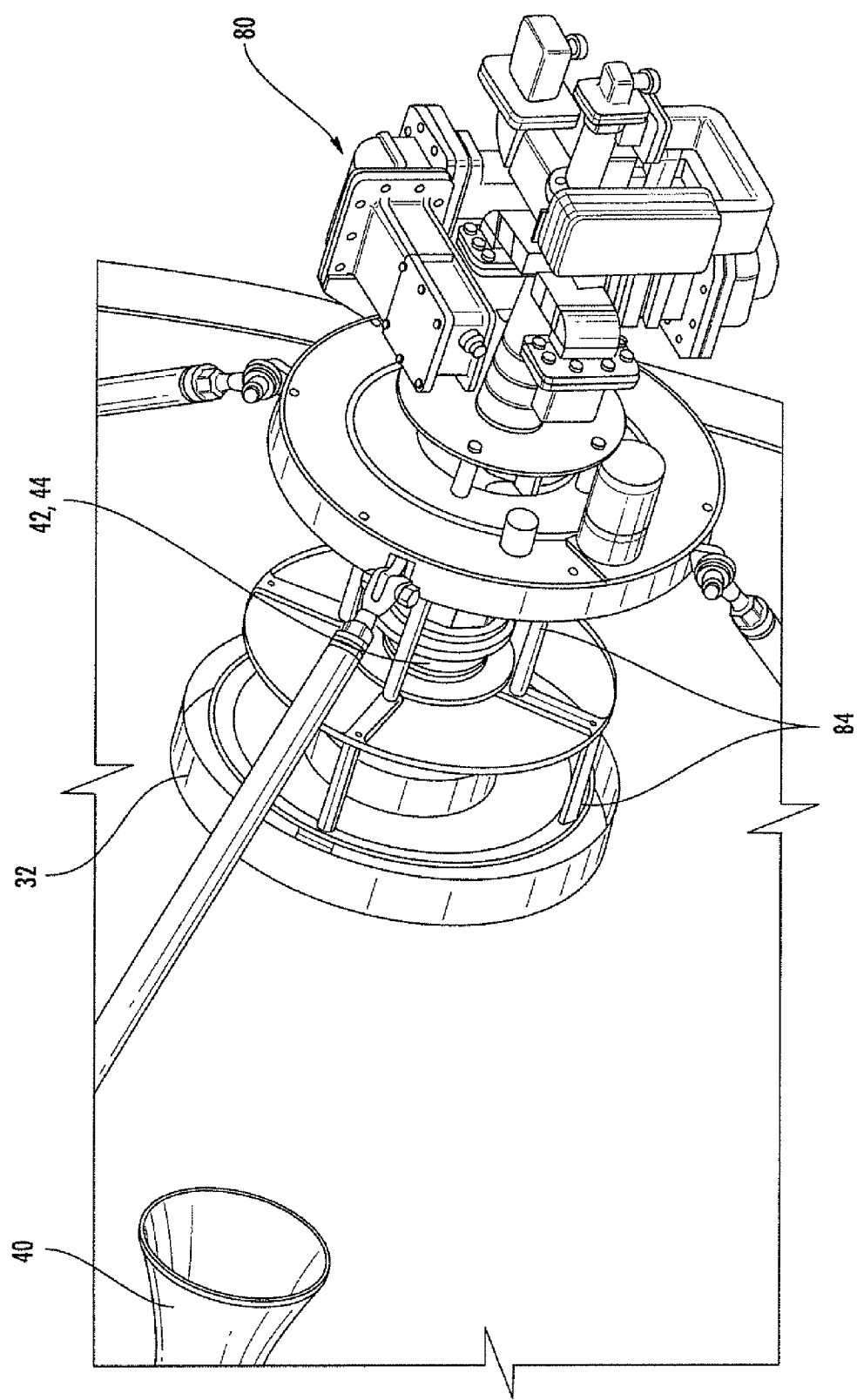
FIG. 2 is a perspective view of the subreflector illustrated in FIG. 1 with respect to the first antenna feed and the second and third antenna feeds.

An enlarged view of the subreflector 32 is provided in FIG. 2. When the first antenna feed 40 is operating in the transmit mode, radio frequency (RF) signals from the first antenna feed are reflected by the subreflector 32 to the main reflector 30 which then directs the RF signal to a satellite. When the first antenna feed 40 is operating in the receive mode, RF signals received by the main reflector 30 are reflected to the subreflector 32, which then directs the RF signal to the first antenna feed 40.

Figure 3:
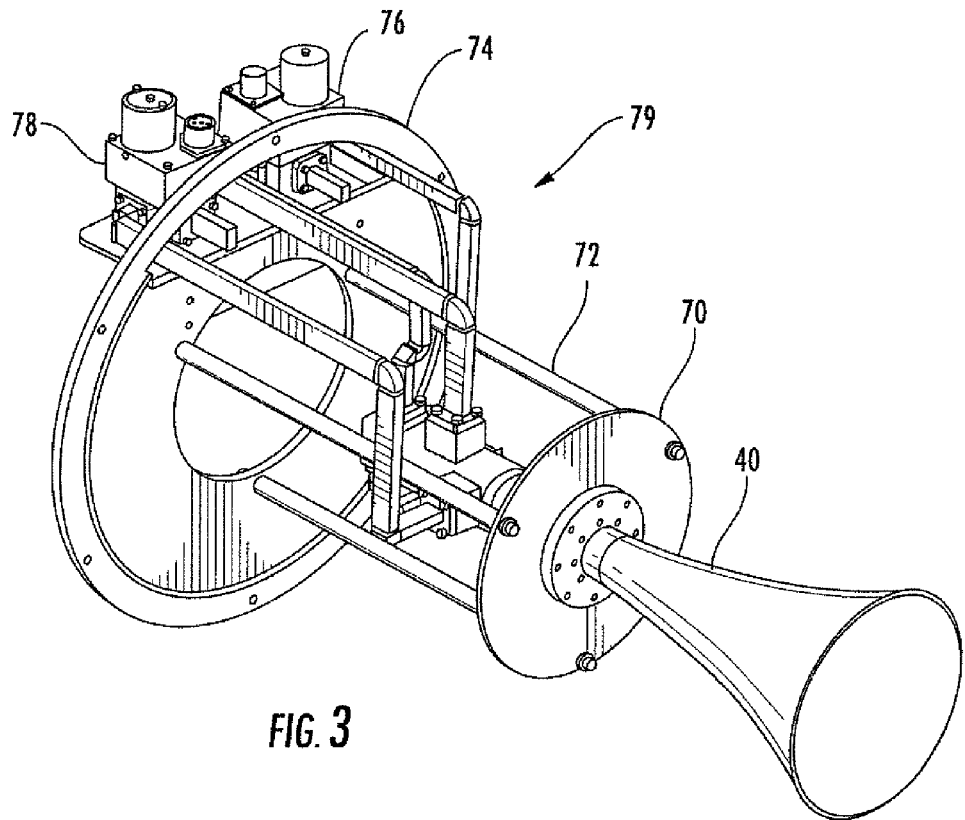
FIG. 3 is a front perspective view of the first antenna feed illustrated in FIG. 1.
Figure 4:
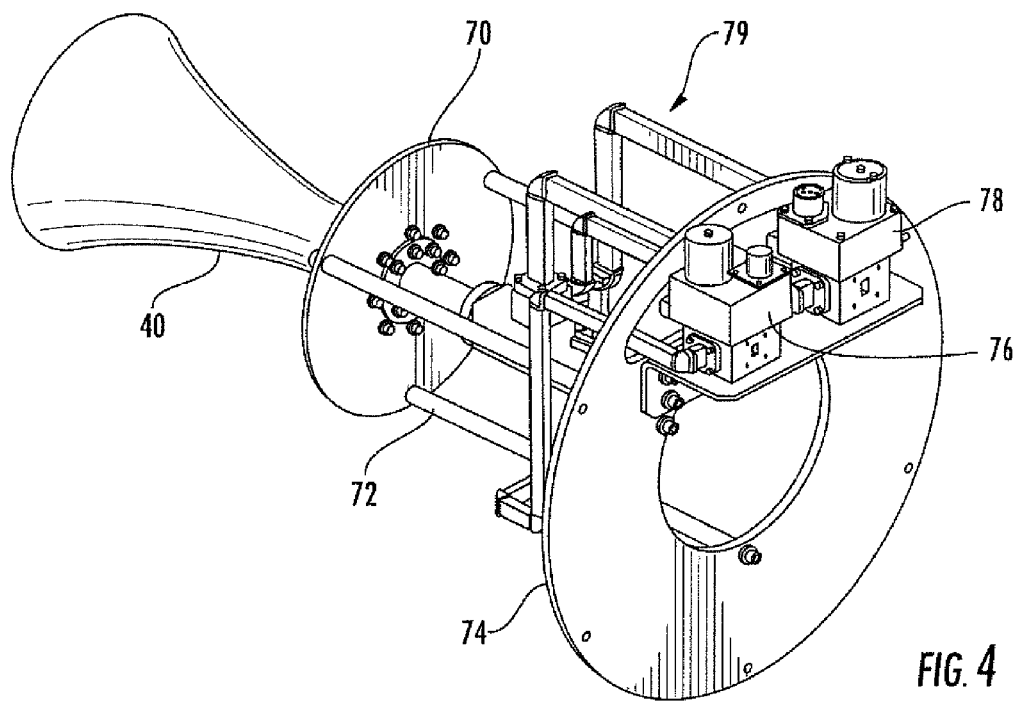
FIG. 4 is a rear perspective view of the first antenna feed illustrated in FIG. 1.

The first antenna feed 40 is mounted to a front antenna feed mounting plate 70, as illustrated in FIGS. 3 and 4. Support rods 72 extend from the front antenna feed mounting plate 70 to a rear antenna feed mounting plate 74. The front antenna feed mounting plate 70 is positioned in front of the main reflector 30, whereas the rear antenna feed mounting plate 74 is positioned to the rear of the main reflector. Transmit and receive switches 76, 78 are carried by the rear antenna feed mounting plate 74. The transmit and receive switches 76, 78 are coupled to a waveguide assembly 79. Although not shown in the figures, an additional waveguide assembly is coupled to the transmit and receive switches 76, 78.

The waveguide assembly 79 thus interfaces with a low-noise block downconverter (LNB) for receiving RF signals in the first frequency band. The LNB is a combination of a low-noise amplifier, a frequency mixer, a local oscillator and an IF amplifier. The LNB receives the RF signals from the satellite as collected by the main reflector 30 and reflected by the sub-reflector 32, amplifies the RF signals, and down-converts a frequency of the RF signals to an intermediate frequency (IF). The waveguide assembly 79 also interfaces with a block upconverter (BUC) for transmitting RF signals to the satellite. The BUC converts from an IF frequency to the desired operating frequency.

Figure 5:
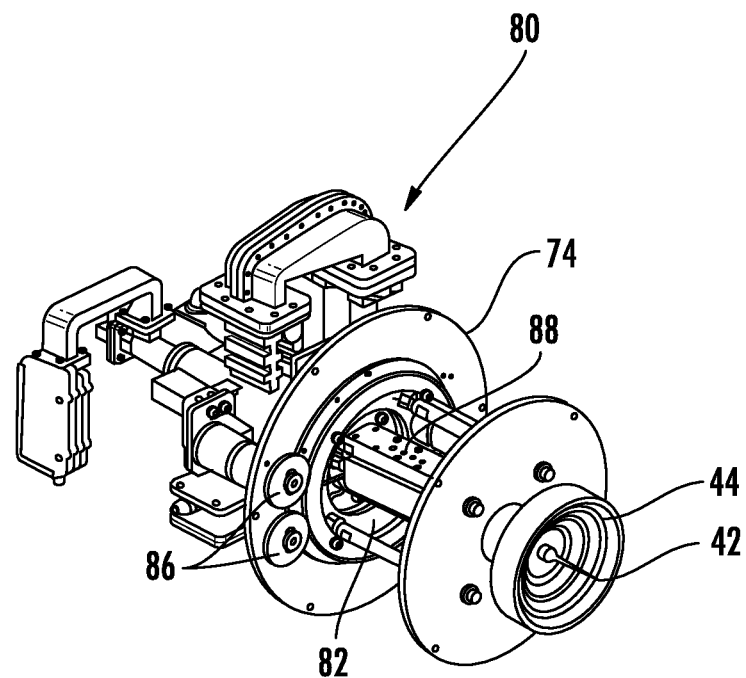
FIG. 5 is a front perspective view of the second and third antenna feeds illustrated in FIG. 1 without the frequency selective surface (FSS) material.
Figure 6:
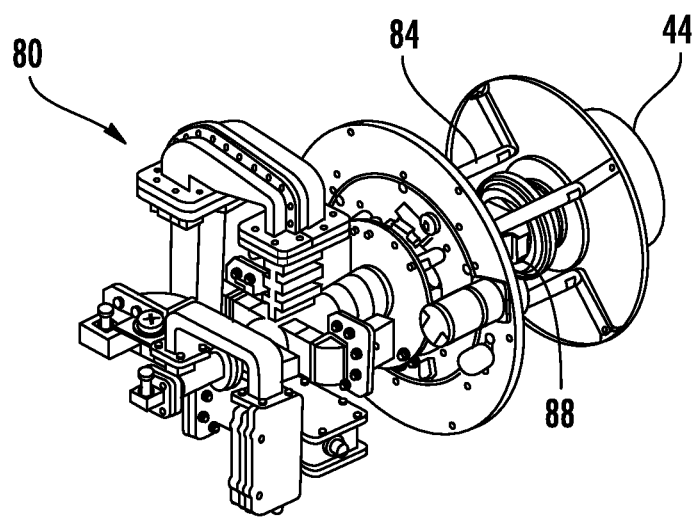
FIG. 6 is a rear perspective view of the second and third antenna feeds illustrated in FIG. 1 without the FSS material.

The second antenna feed 42 is configured as an elongated center conductor, and the third antenna feed 44 is configured as a series of stepped circular conductors surrounding and spaced apart from the elongated center conductor, as best illustrated in FIGS. 5 and 6. The second and third antenna feeds 42, 44 are coupled to a waveguide assembly 80. Similar to the waveguide assembly 79, this waveguide assembly 80 interfaces with respective LNBs and BUCs for the second and third antenna feeds 42, 44.

The second and third antenna feeds 42, 44 advantageously share the same physical space. The second and third antenna feeds 42, 44 are configured similar to a coaxial cable. The RF signals for the second antenna feed 42 travel down the inner conductor, whereas the RF signals for the third antenna feed 44 travel down the outer conductor.

The waveguide assembly 80 includes a rotatable base 82 mounting the second and third antenna feeds 42, 44 and the subreflector 32. A plurality of struts 84 are coupled between the rotatable base 80 and the subreflector 32. Gears 86 are used to rotate the second and third antenna feeds 42, 44 so that linear polarization is lined up properly with the satellite. The subreflector 32 also rotates with rotation of the second and third antenna feeds 42, 44. Alternatively, the subreflector 32 may be configured so that is does not rotate with rotation of the second and third antenna feeds 42, 44.

The second antenna feed 42 (i.e., Ku-band) only operates in linear polarization (vertical or horizontal). The third antenna feed 44 (i.e., C-band) operates in linear polarization (vertical or horizontal) or circular polarization (left hand or right hand circular polarization). When both the second and third antenna feeds 42, 44 are operating in linear polarization, then both feeds are rotated simultaneously until the proper linear polarization is lined up with the satellite.

If the third antenna feed 44 is operating in circular polarization, then rotation of the rotatable base 82 has no effect on the circular polarization. In other words, circular polarization is not effected by linear polarization. To adjust for left hand or right hand circular polarization, a polarizer 88 is rotated.

The satellite antenna assembly 120 includes a stabilization platform 150 coupled to the main reflector 130. The stabilization platform 150 moves the main reflector 130 based on a desired azimuth and elevation. The stabilization platform 150 also maintains the main reflector 130 in the desired azimuth and elevation, such as in a shipboard application, as will be appreciated by those skilled in the art. A radome 160 covers the main reflector 130 and the subreflector 132. The radome 160 is configured to be compatible with the first, second and third frequency bands. The illustrated radome 160 is shown partially cut-away to more clearly illustrate positioning of the main reflector 130 and the subreflector 132, as well as the first, second and third antenna feeds 140, 142, 144.

Figure 7:
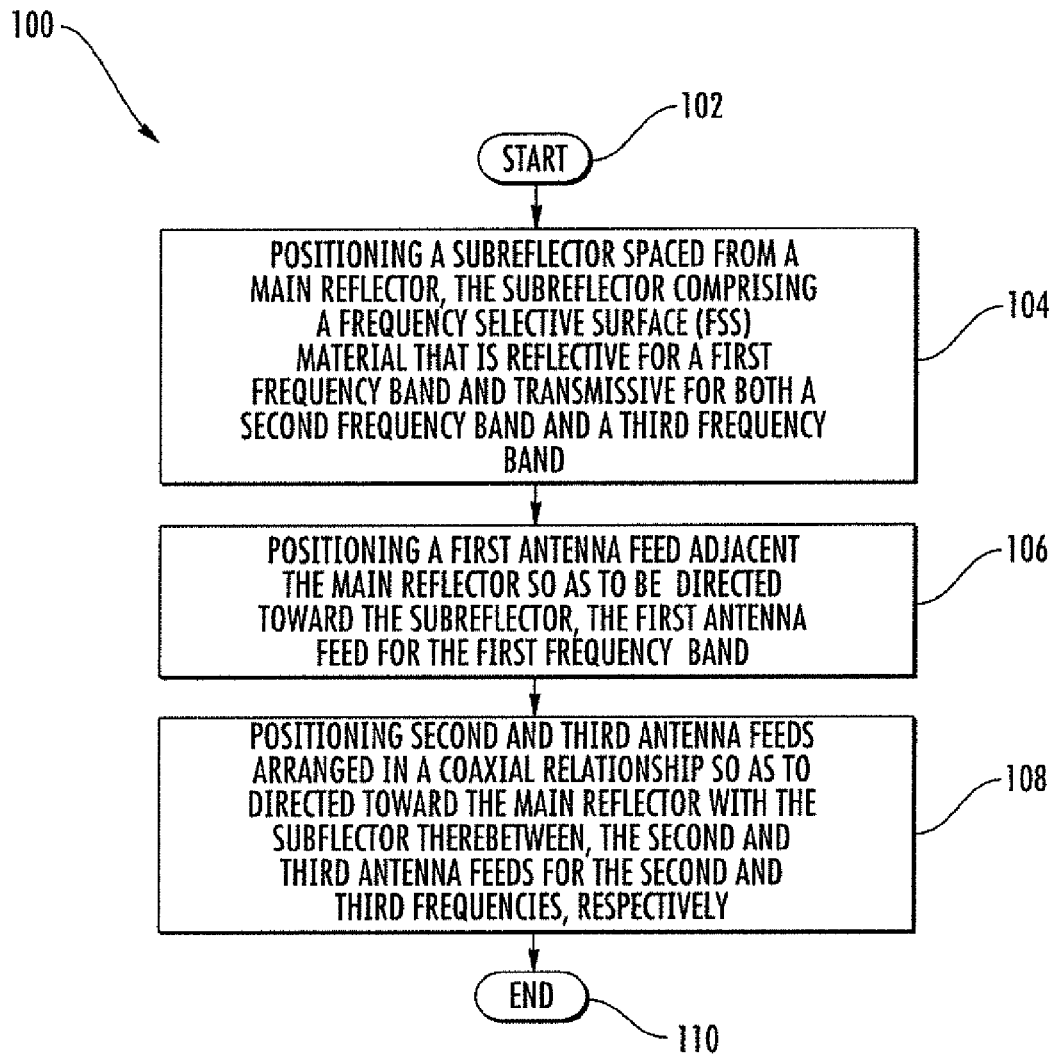
FIG. 7 is a flowchart of a method for making the antenna assembly illustrated in FIG. 1.

Referring now to the flowchart 100 illustrated in FIG. 7, a method for making an antenna assembly 20 as described above will be discussed. From the start (Block 102), the method comprises positioning a subreflector 32 spaced from a main reflector 30 at Block 104, with the subreflector comprising a frequency selective surface (FSS) material that is reflective for a first frequency band and transmissive for both a second frequency band and a third frequency band. A first antenna feed 40 is positioned adjacent the main reflector 30 at Block 106 so as to be directed toward the subreflector 32. The first antenna feed 40 is for the first frequency band. Second and third antenna feeds 42, 44 are arranged in a coaxial relationship and are positioned at Block 108 so as to be directed toward the main reflector 30 with the subreflector 32 therebetween. The second and third antenna feeds 42, 44 are for the second and third frequencies, respectively. The method ends at Block 110.

Figure 8:
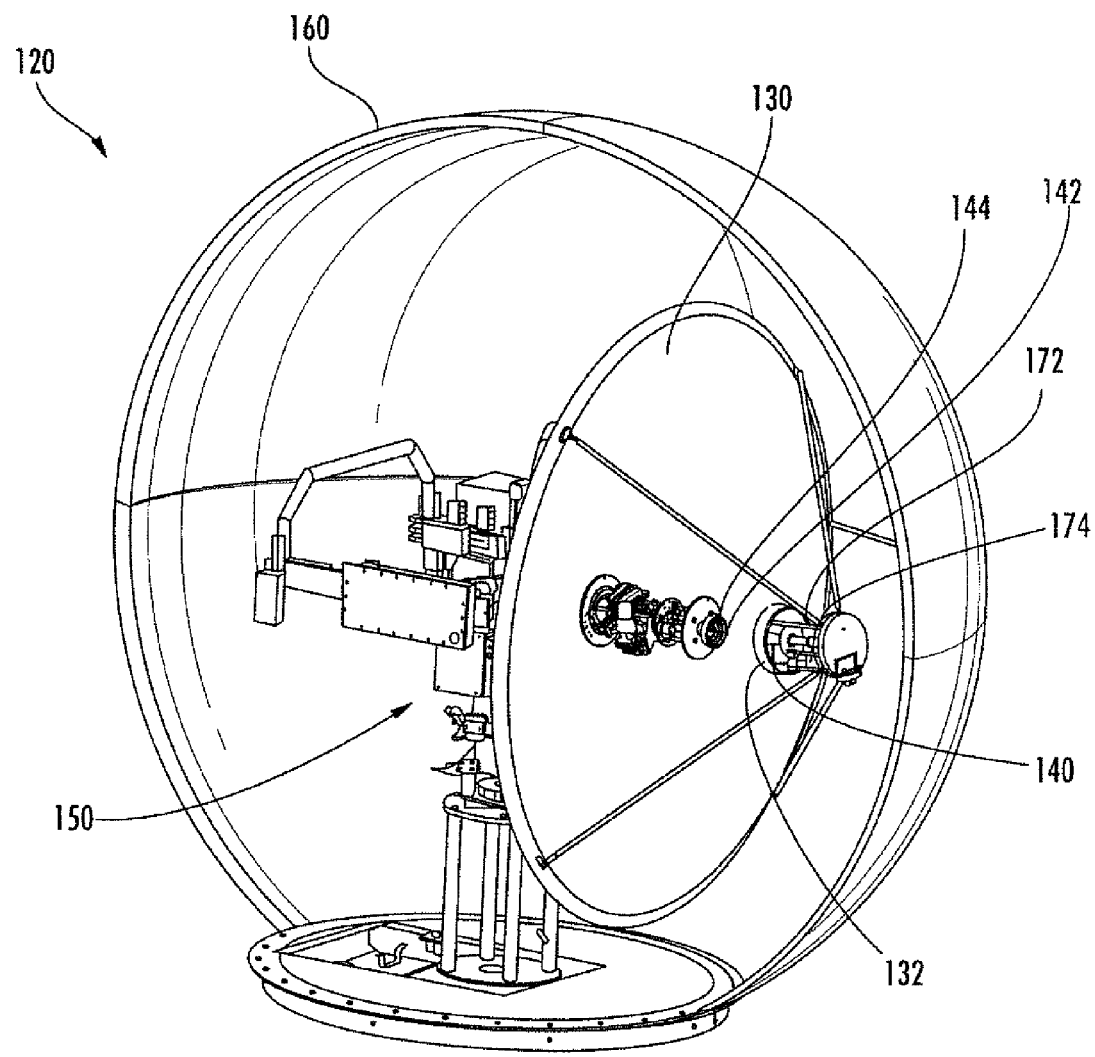
FIG. 8 is a perspective view of another embodiment of a satellite antenna assembly with three antenna feeds in accordance with the present invention.

Referring now to FIG. 8, another embodiment of a satellite antenna assembly 120 will be discussed where positioning of the antenna feeds is reversed. The elements in this embodiment are similar to the elements in the above described satellite antenna assembly 20, and are numbered in the hundreds. Descriptions of the elements in the satellite antenna assembly 20 are applicable to corresponding elements in the satellite antenna assembly 120, except where noted. In addition, the features and advantages of the first embodiment of the antenna assembly 20 are also applicable to this embodiment 120 as well.

The antenna assembly 120 includes a main reflector 130 and a subreflector 132 spaced from the main reflector. The subreflector 132 includes a frequency selective surface (FSS) material that is transmissive for a first frequency band and reflective for both a second frequency band and a third frequency band.

A first antenna feed 140 is adjacent the subreflector 132 and is directed towards the main reflector 130. The first antenna feed 140 is for the first frequency band. Second and third antenna feeds 142, 144 are arranged in a coaxial relationship adjacent the main reflector 130 and are directed toward the subreflector 132. The second and third antenna feeds 142, 144 are for the second and third frequency bands, respectively.

A mounting plate 174 mounts the first antenna feed 140, and struts 172 are coupled between the mounting plate and the subreflector 132. The first antenna feed 140 is positioned between the mounting plate 174 and the subreflector 132. In other words, the first antenna feed 140 is behind the subreflector 132.

Figure 10:
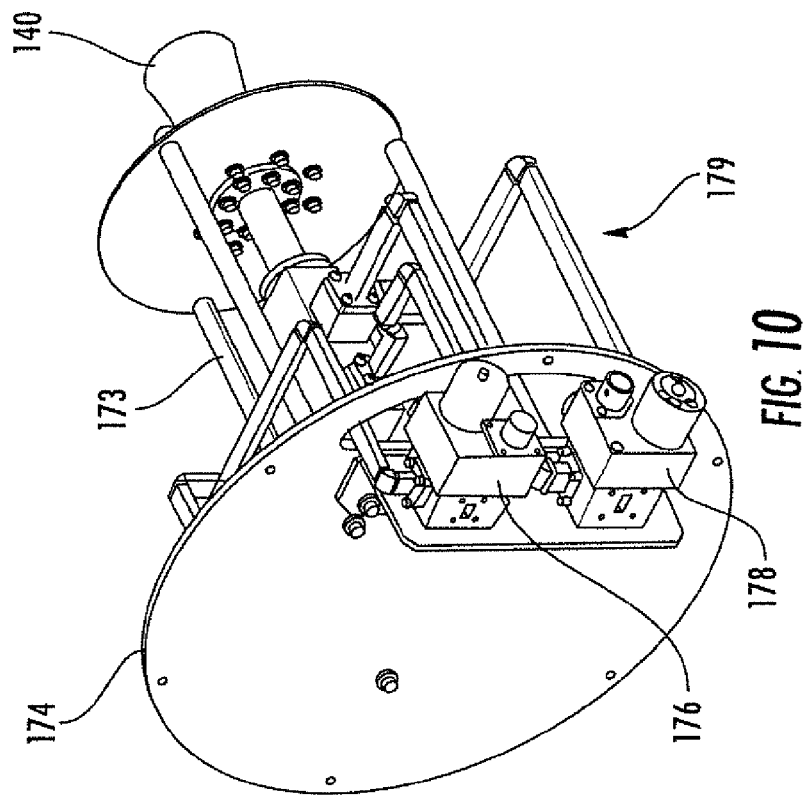
FIG. 10 is a rear perspective view of the first antenna feed illustrated in FIG. 8 without the FSS material.
Figure 9:
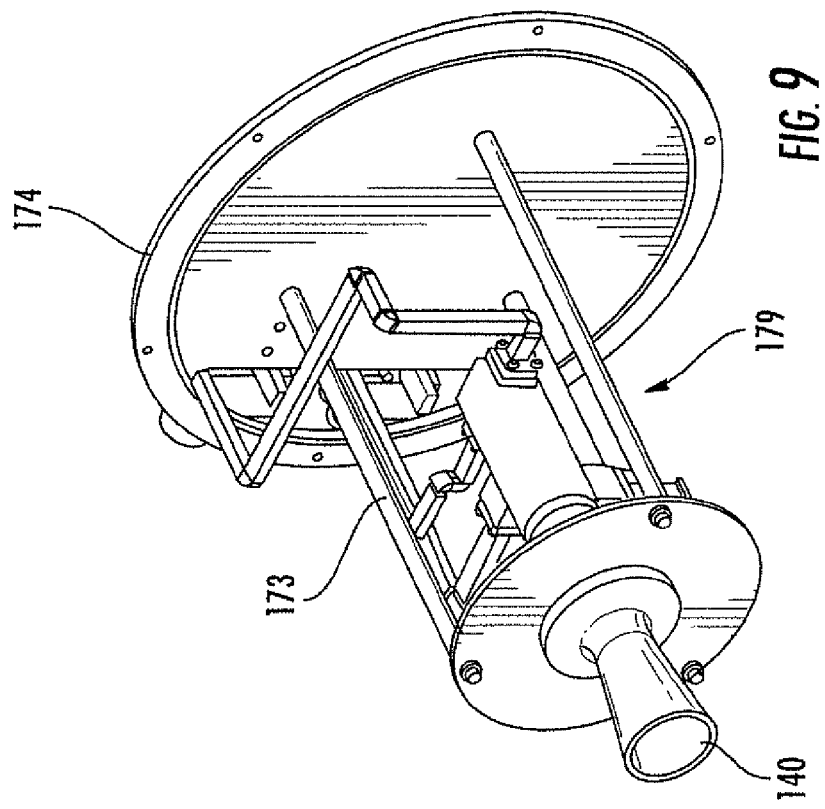
FIG. 9 is a front perspective view of the first antenna feed illustrated in FIG. 8 without the FSS material.

Front and rear perspective views of the first antenna feed 140 without the subreflector 132 are provided in FIGS. 9 and 10. Additional struts 173 are coupled between the mounting plate 174 and the first antenna feed 140.

The first antenna feed 140 is configured as an antenna feed horn. Transmit and receive switches 176, 178 are carried by the rear of the mounting plate 174. A waveguide assembly 179 is coupled between the transmit and receive switches 176, 178 and the first antenna feed 140. Although not shown in the figures, an additional waveguide assembly is coupled to the transmit and receive switches 176, 178.

Figure 12:
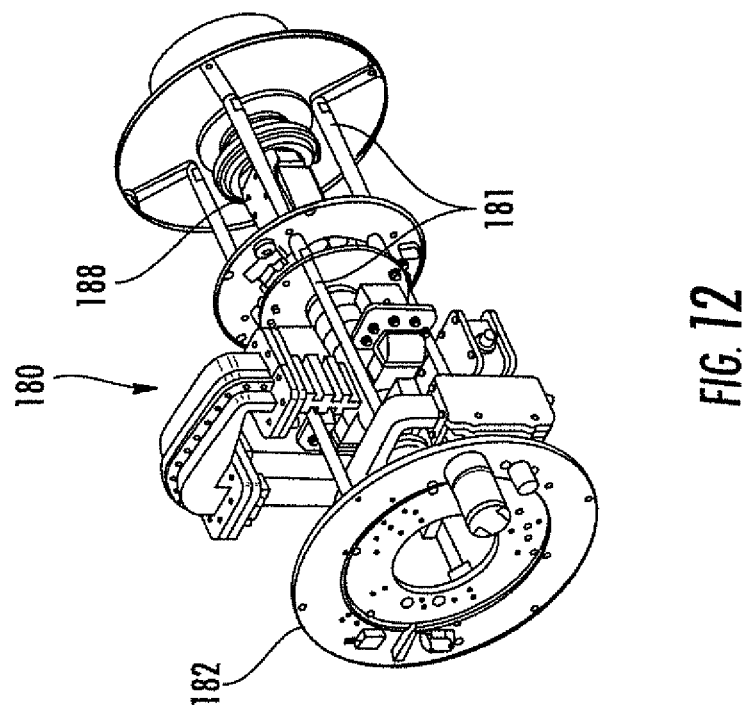
FIG. 12 is a rear perspective view of the second and third antenna feeds illustrated in FIG. 8.
Figure 11:
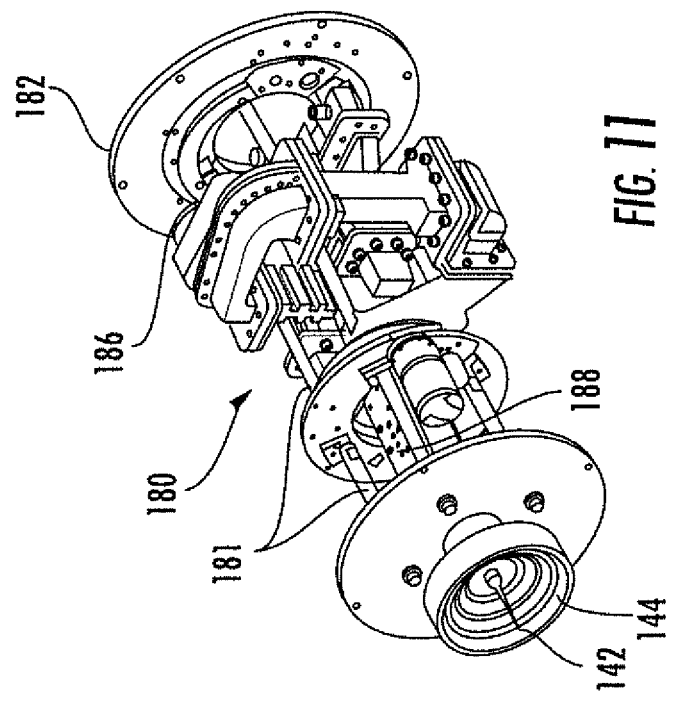
FIG. 11 is a front perspective view of the second and third antenna feeds illustrated in FIG. 8.

The second antenna feed 142 is configured as an elongated center conductor, and the third antenna feed 144 is configured as a series of stepped circular conductors surrounding and spaced apart from the elongated center conductor, as best illustrated in FIGS. 11 and 12. The second and third antenna feeds 142, 144 are coupled to a waveguide assembly 180.

The waveguide assembly 180 includes a rotatable base 182 mounting the second and third antenna feeds 142, 144. Struts 181 are coupled between the rotatable base 182 and the second and third antenna feeds 142, 144. Gears 186 are used to rotate the second and third antenna feeds 142, 144 so that linear polarization is lined up properly with the satellite.

If the third antenna feed 144 is operating in circular polarization, then rotation of the rotatable base 182 has no effect on the circular polarization. In other words, circular polarization is not effected by linear polarization. To adjust for left hand or right hand circular polarization, a polarizer 188 is rotated.

Figure 13:
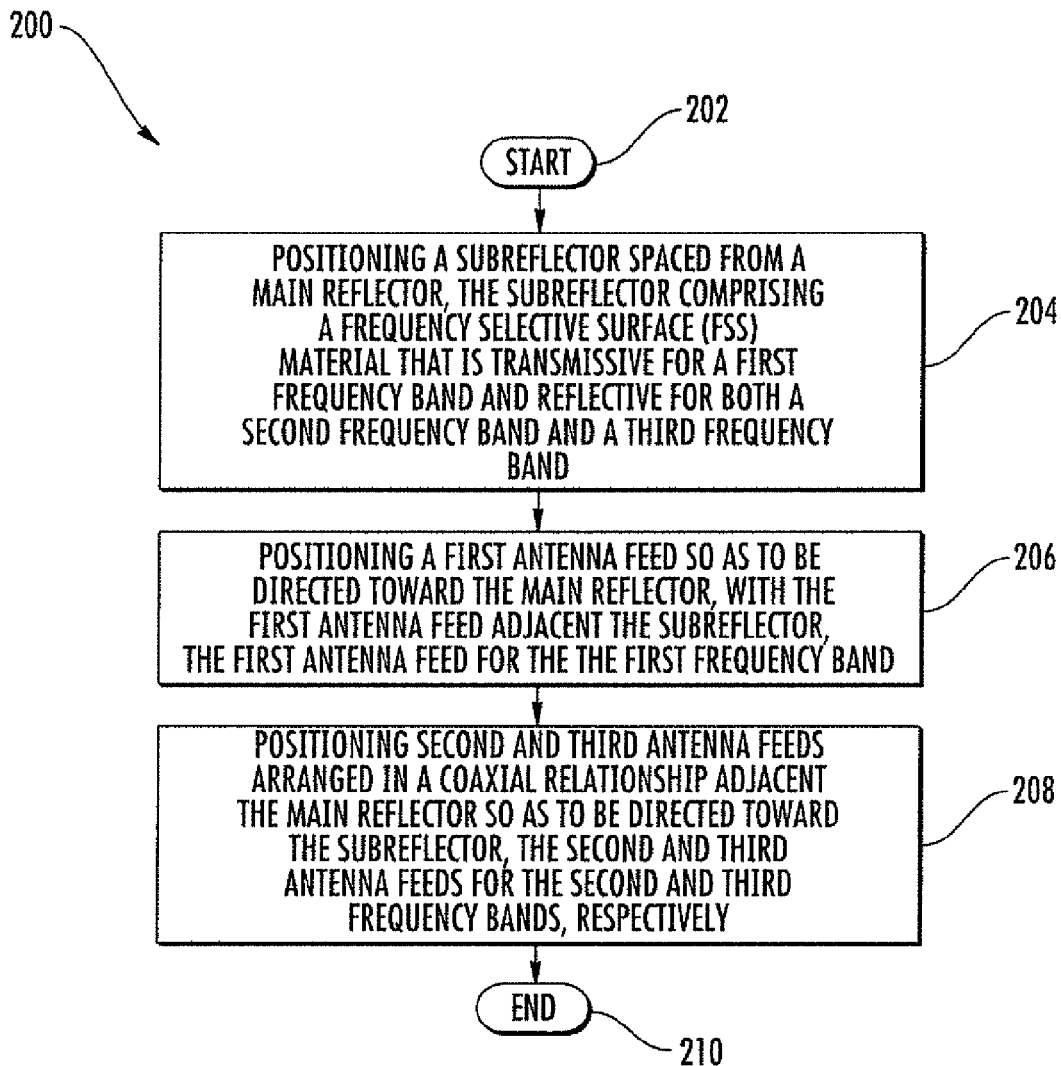
FIG. 13 is a flowchart of a method for making the antenna assembly illustrated in FIG. 8.

Referring now to the flowchart 200 illustrated in FIG. 13, a method for making an antenna assembly 120 as described above will be discussed. From the start (Block 202), the method comprises positioning a subreflector 132 spaced from a main reflector 130 at Block 204, with the subreflector comprising an FSS material that is transmissive for a first frequency band and reflective for both a second frequency band and a third frequency band. A first antenna feed 140 is positioned at Block 206 so as to be directed toward the main reflector 130, with the first antenna feed being carried by the subreflector 132. The first antenna feed 140 is for the first frequency band. Second and third antenna feeds 142, 144 arranged in a coaxial relationship are positioned at Block 208 adjacent the main reflector 130 so as to be directed toward the subreflector 132. The second and third antenna feeds 142, 144 are for the second and third frequency bands, respectively. The method ends at Block 210.

Figure 14:
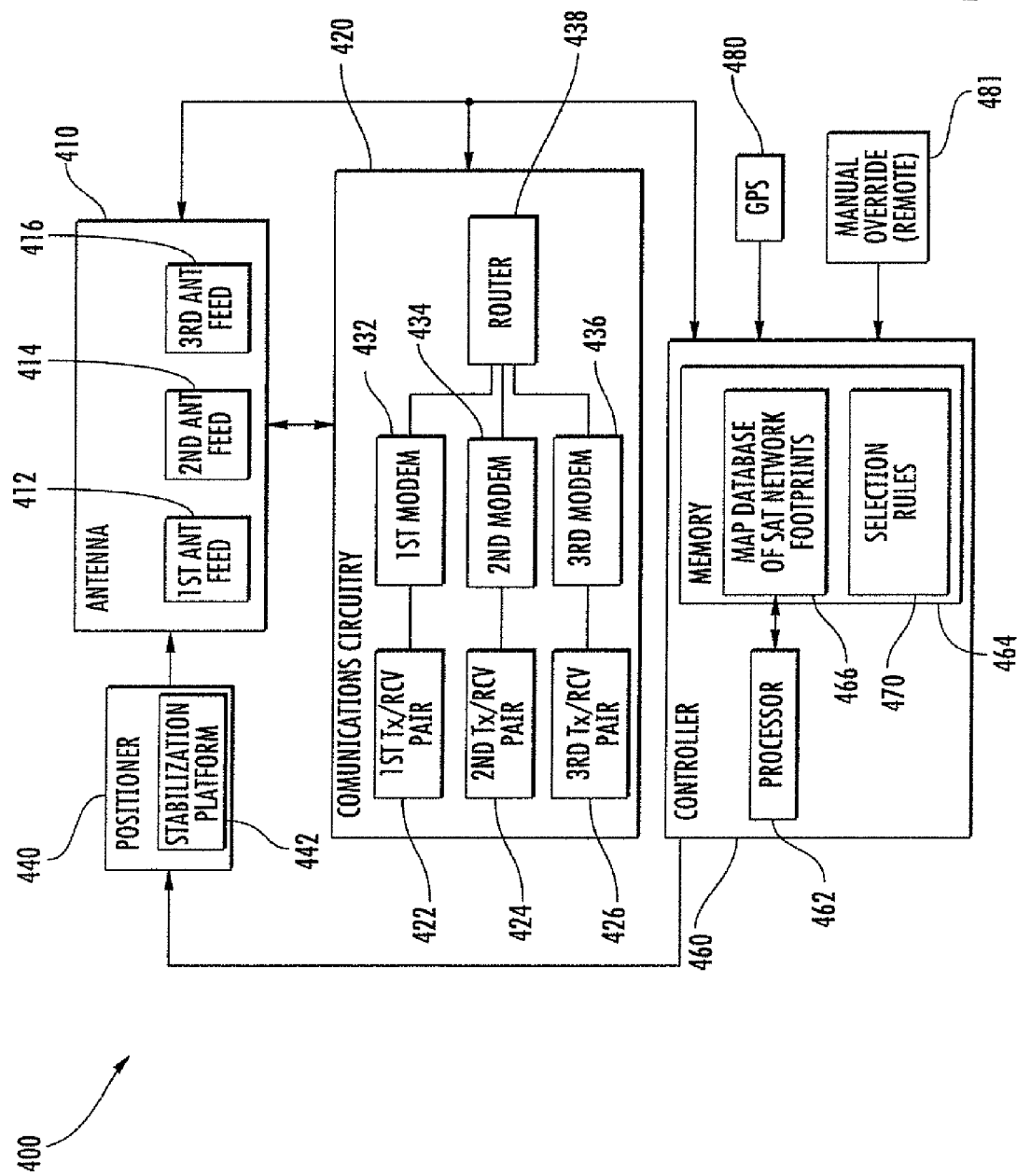
FIG. 14 is a block diagram of a satellite communications terminal for a ship in accordance with the present invention.

Another aspect is directed to a satellite communications terminal 400 for a ship, as illustrated in FIG. 14. The ship may be any structure that floats on water, including, but limiting to, oil and gas exploration ships, passenger vessels, cruise lines, and military vessels, for example. The satellite communications terminal 400 includes an antenna 410 comprising three antenna feeds 412, 414, 416 operable at respective different frequencies. Communications circuitry 420 is coupled to the three antenna feeds and is configurable for a selected antenna feed. The antenna 410 and the communications circuitry 420 are based on either one of the above described satellite satellite antenna assemblies 20, 120, for example.

A positioner 440 mounts the antenna 410 to the ship and points the antenna. A controller 460 is used to select an antenna feed, configure the communications circuitry 420, and operate the positioner 440 to point the antenna 410 to a selected satellite all based upon the location of the ship and one or more selection rules 470.

The controller 460 may also be referred to as an integrated call director (ICD) since it is aware of the operator's communications traffic and handles the routing of communications traffic on and off the ship. The controller 460 is a geographically aware smartbox that recognizes where the antenna 410 is around the world, and carries a map database 466 of the satellite network footprints that are available.

The controller 460 and multi-band antenna 410 advantageously allows for seamless roaming across all satellite types, including geostationary and non-geostationary. The controller 460 selects the appropriate frequency band depending on location of the ship, frequency band availability, topology and application. The different types of satellites operate over separate frequency bands, such as Ka-band, Ku-band, and C-band, for example.

Frequency band and satellite selection by the controller 460 may be based on a plurality of different inputs, such as what capacity is available, what frequency band provides the best application performance, what frequency band provides the best resilience, what frequency band results in compliance to a regulator's requirement with respect to allowable transmission frequencies. The controller 460 may thus route the ship's communications traffic intelligently over the most appropriate satellite network path based on speed, latency, location and cost. By optimizing the satellite network traffic, the controller 460 advantageously enhances the end-to-end experience with an intelligent routing approach that provides end-to-end application performance management.

The controller 460 also allows for the ability to mitigate interferences or boost network speeds by using two or more frequency bands simultaneously. In addition to satellite communications, the controller 460 includes the capability to integrate other transport technologies, such as wireless systems including cellular and WiFi communications, for example, so as to optimize client experience and application performance by accessing any available transport path in a given location. In some embodiments, fiber optics may also be supported.

The illustrated antenna 410 with three antenna feeds includes a first antenna feed 412, a second antenna feed 414 and a third antenna feed 416. The first antenna feed 412 is for the Ka-band, the second antenna feed 414 is for the Ku-band, and the third antenna feed 416 is for the C-band. The first, second and third antenna feeds 412, 414, 416 may be simultaneously operable. Since selection of anyone of the three antenna feeds 412, 414, 416 may be done on the fly, this may avoid the need for manually reconfiguring the antenna assembly to a desired frequency band at a desired port. The antenna 410 is not limited to these frequency bands. As readily appreciated by those skilled in the art, anyone of the antenna feeds 412, 414, 416 may be configured to operate at a different frequency band. In other embodiments, additional frequency bands may be supported by the antenna 410.

The illustrated communications circuitry 420 includes a respective transmitter and receiver pair associated with each antenna feed. A first transmitter and receiver pair 422 is coupled to the first antenna feed 412. A second transmitter and receiver pair 424 is coupled to the second antenna feed 414. A third transmitter and receiver pair 426 is coupled to the third antenna feed 416.

Each transmitter and receiver pair has a respective modem associated therewith. A first modem 432 is coupled to the first transmitter and receiver pair 422. A second modem 434 is coupled to the second transmitter and receiver pair 424, and a third modem 436 is coupled to the third transmitter and receiver pair 426. A router 438 is coupled to the first, second and third modems 432, 434, 436.

The antenna 410 includes a main reflector cooperating with the three antenna feeds 412, 414, 416, and a subreflector spaced from the main reflector. The positioner 440 includes a stabilization platform 442. The stabilization platform 442 moves the main reflector based on a desired azimuth and elevation. The stabilization platform 442 also maintains the main reflector in the desired azimuth and elevation, which is important in a shipboard application, as will be appreciated by those skilled in the art.

The controller 460 further includes a remote override interface 481 to permit a remote station to override at least one of selection of the antenna feed 412, 414, 416, configuration of the communications circuitry 420, and pointing of the antenna 410. In other words, although the satellite communications terminal 400 is generally autonomous, in some circumstances it may be desirable to override the satellite network being used at the ship. The remote override interface 481 also permits an operator on board the ship to override the controller 460.

Figure 15:
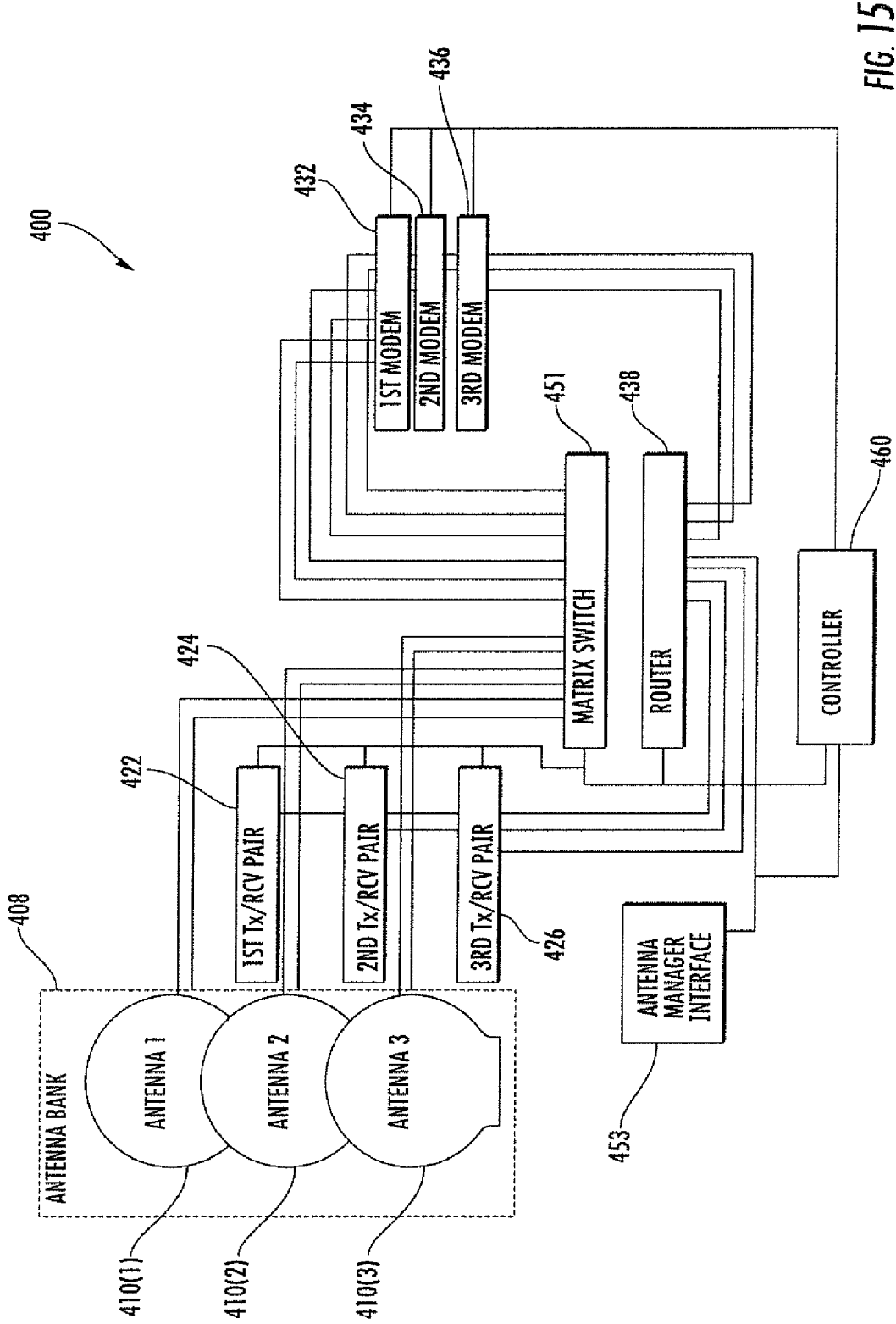
FIG. 15 is a simplified block diagram of the satellite communications terminal illustrated in FIG. 14 with multiple antenna assemblies.

To avoid signal blockage with a desired satellite as a result of where the antenna 410 is located on the ship, a ship typically multiple antennas, as illustrated in FIG. 15. For example, antenna 410(1) may be located on the port side, antenna 410(2) may be located on the starboard side, and antenna 410(3) may be located forward of the ship. The multiple antennas 410(1), 410(2), 410(3) form an antenna bank 408.

With multiple antennas 410(1), 410(2), 410(3) the satellite communications terminal 400 further includes a matrix switch 451 that is controlled by the controller 460 for selecting which one of the antennas to use. An antenna manager interface 453 is coupled to the router 438 and to the controller 460. The antenna manager interface 453 also allows for a manual override of the controller 460.

The controller 460 includes a processor 462 and a memory 464 coupled thereto. The map database 466 of the satellite network footprints is stored in the memory 464. As noted above, the controller 460 operates the positioner 440 to point the antenna 410 to a selected satellite so as to route the ship's communications traffic intelligently over the most appropriate satellite network path based on number of different variables, such as location of the ship and one or more selection rules 470. The selection rules 470 are also stored in the memory 464.

The location of the ship may be determined by GPS 480, for example. The selection rules 470 may be based on communications speed, communications latency, and/or communications cost. The selection rules 470 may also be based on a communications circuitry configuration rule and/or a service level agreement rule.

For the communications circuitry configuration rule, location of the ship verses available network options are taken into consideration when selecting the transmitter and receiver pair and corresponding antenna feed. For the service level agreement rule, service criteria such as quality of service (QoS) and bit rates are taken into consideration when selecting the transmitter and receiver pair and corresponding antenna feed.

Operation of anyone of the three antenna feeds 414, 416, 418 has performance and communication cost criteria associated therewith. For the performance criteria, this includes speed and communication latency. For example, the O3b satellite constellation is a next generation of satellites that operate in the Ka-band. The Ka-band satellites are deployed in a medium earth orbit as compared to a geosynchronous orbit used by C-band/Ku-band satellite constellations. An advantage of a medium earth orbit is that latency times for voice and data communications are significantly reduced. Each one of these different satellite types has a communication cost factor associated therewith. The circuitry configuration rule may thus be used to select a particular transmitter and receiver pair and corresponding antenna feed.

The controller 460 also stores antenna pointing data for different satellite footprints at different ship locations in the memory 464, and operates the positioner 440 according to the antenna pointing data. The controller 460 selects the antenna feed 412, 414, 416, configures the communications circuitry 420, and operates the positioner 440 also based upon a communications circuitry status and/or a time-of-day. The time-of-day is relevant to non-geostationary satellites.

Figure 16:
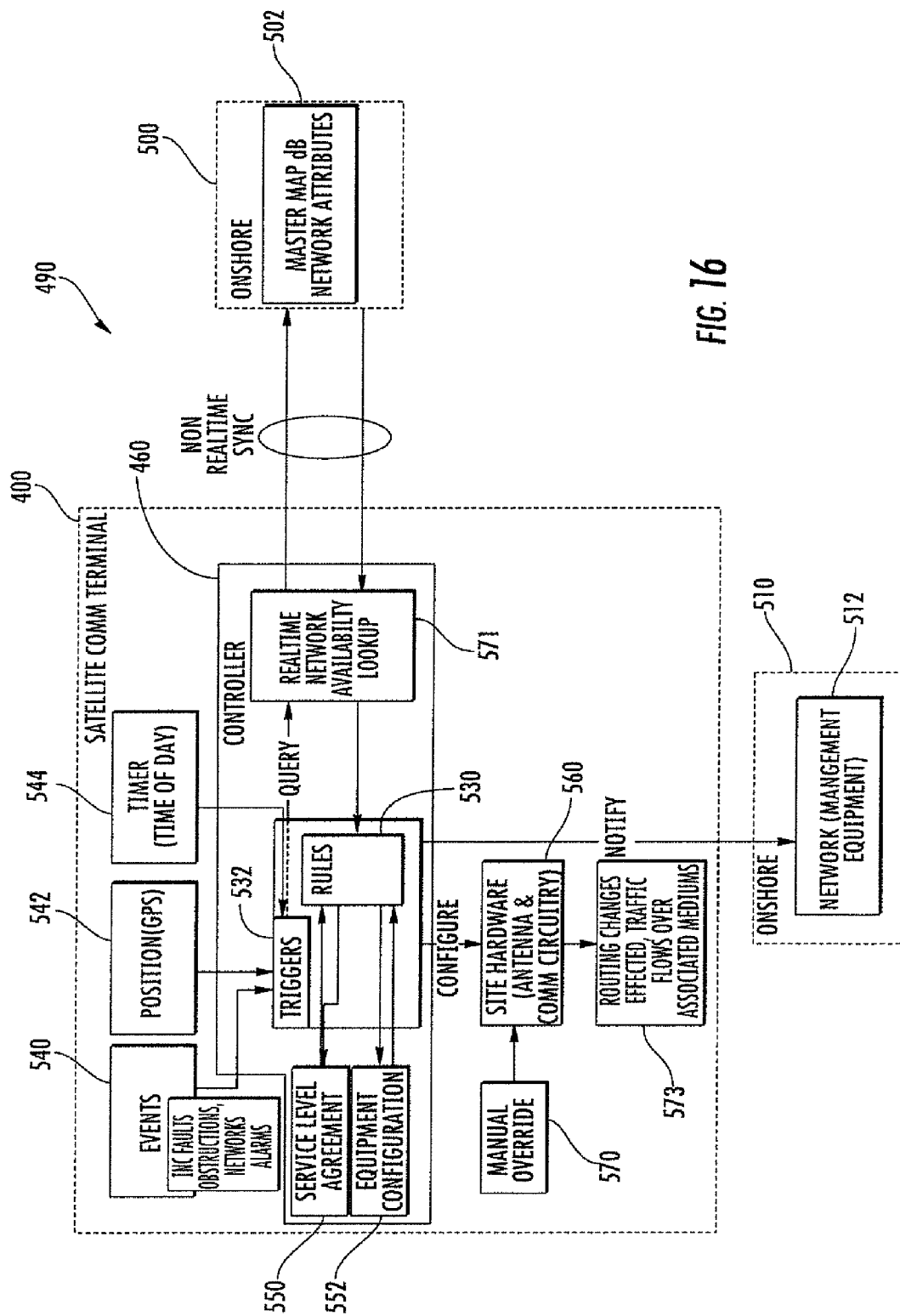
FIG. 16 is a functional block diagram of the satellite communications terminal illustrated in FIG. 14.

A functional block diagram 490 of the satellite communications terminal 400 will now be discussed with reference to FIG. 16. In the functional block diagram, the satellite communications terminal 400 for the ship interfaces with multiple on-shore locations 500, 510.

One on shore location 500 stores a master map database 502 of the satellite network footprints that are available. This allows for real time network availability lookup 571. The map database 466 of the satellite network footprints as stored in the controller 460 is also periodically synchronized with the on shore master map database 502 for updates.

Another on shore location 510 includes network management equipment 512 that receives notification when a change is made from a current communications circuitry and corresponding antenna feed to a different communications circuitry and corresponding antenna feed. The network management equipment 512 is configured for reference and troubleshooting purposes. In addition, additional network usage metrics may be delivered periodically to the management equipment 512 to facilitate further analysis on network path utilization and cost management. Communications between the satellite communications terminal 400 and the on shore locations 500, 510 is via a secure encrypted link as background traffic via the available paths.

Functionally the controller 460 includes a selection rules module 530 and a trigger module 532. Events 540, position 542 of the ship, and time 544 are provided to the trigger module 532. The events 540 correspond to system faults, antenna obstructions and network alarms, for example. Position 542 of the ship may be provided by a GPS device 480, for example. Time-of-day 544 may be provided by a timer or clock, for example.

A service level agreement module 550 and an equipment configuration module 552 interface with the selection rules module 530. The selection rules module 530 operates based upon a set of selection rules to select the appropriate frequency band.

The controller 460 assesses location 542 of the ship against available network options by querying the locally held map database 466. Information from the map database 466 is used by the selection rules module 530 which reconfigures the hardware 560 as necessary. For example, the change may be from the second antenna feed (e.g., Ku-band) to the third antenna feed (e.g., C-band). This requires reconfiguring the antenna 410 and communications circuitry 420 with the appropriate satellite modem parameters so as to enter the corresponding network. These parameters are identified in functional block 573. As part of the reconfiguring process reference is made to information stored in the site service level agreement module 550 and the equipment capabilities module 552.

The network traffic from the ship then self adapts by application priority using performance routing, such as Cisco's PfRv3 performance routing. Performance routing monitors application performance on a per flow basis, and applies what is learned to select the best path for that application. Using smart-probe intelligence, flows may be monitored passively. Probes may be sent only when specifically needed to further enhance efficiency. Performance routing effectively load balances across multiple paths while delivering the best application level service level agreement. Performance routing provides intelligent path control for application-aware routing. A graphical user interface 570 with manual override is provided to allow engineers to directly monitor and control the hardware 560 (i.e., antenna 460 and communications circuitry 420).

Figure 17:
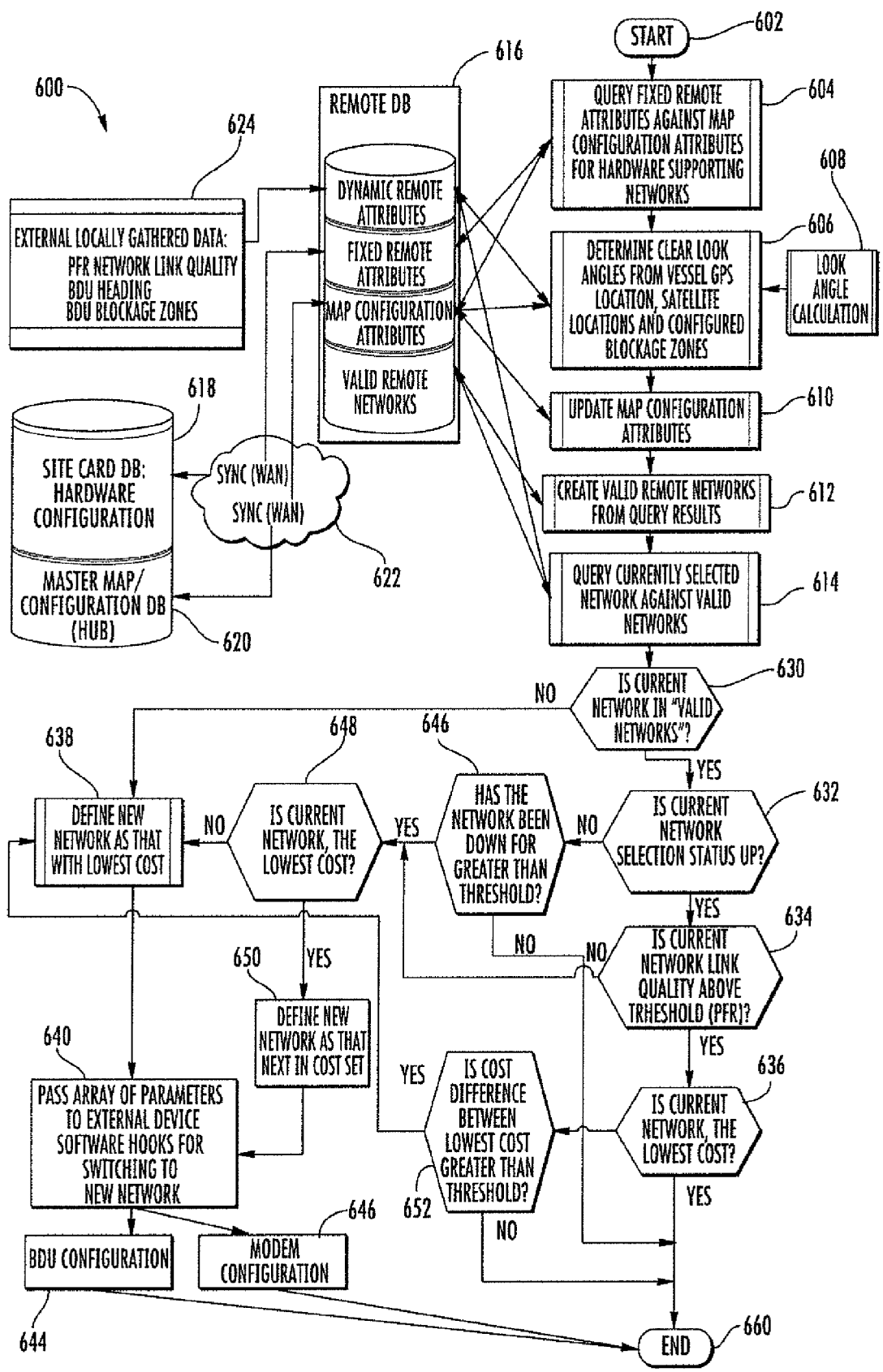
FIG. 17 is a flowchart of a method for operating the satellite communications terminal illustrated in FIG. 14.

A flowchart 600 for operating the satellite communications system 400 for a ship will now be discussed in reference to FIG. 17. From the start 602, a fixed remote attributes query is performed at Block 604 against map configuration attributes for hardware supporting networks. A clear look angle is then determined at Block 606 based on location of the ship, satellite locations and configured blockage zones. Look angle calculations are performed at Block 608 and are provided to Block 606. Map database configuration attributes are updated at Block 610.

Valid remote networks are created at Block 612 from the above query results. The currently selected network is queried at Block 614 against valid networks. Blocks 604, 606, 610, 612 and 614 may also interface with a remote database at Block 616 to access different attributes and network information as needed. The remote database at Block 616 may also be updated with site hardware configuration at Block 618 and with a master map database at Block 620. This update may be performed over a wireless area network (WAN) 622. In addition, external locally gathered data may be provided to the remote database at Block 624. The data includes network link qualities, headings and blockage zones, for example.

A determination is made at block 630 if the currently selected network is a valid network. If yes, then a determination is made at block 632 if the current network selection has an up status. If yes, then a determination is made at block 634 if the current network link quality is above a threshold. If yes, then a determination is made at Block 636 if the current network is the lowest cost network. If Yes, then the method ends at Block 660.

Referring back to Block 630, if the currently selected network is not a valid network, then a new network with the lowest cost is selected at Block 638. Next, at Block 640, an array of parameters is passed to external software hooks for switching to the new network. This involves updating the BDU (below deck controller) configuration at Block 642 and updating the modem configuration at Block 644. After the updates, the method ends at Block 660.

Referring back to Block 632, if the current network selection status is not up, then a determination is made at Block 646 as to whether the network has been down greater than a threshold. If yes, then a determination is made at Block 648 if the network is the lowest cost. If the network is not the lowest cost, then a new network is defined at Block 638. If the network is the lowest cost, then the next lowest cost network is selected at Block 650. The parameters and configuration for the new network are then updated at Blocks 640, 642 and 644. The method ends at Block 660.

Referring back to Block 634, if the current network link quality is below the threshold, then a determination is made at Block 648 if the current network is the lowest cost. Referring back to Block 636, if the current network is not the lowest cost, then a determination is made at Block 652 if the cost difference between the lowest cost network is greater than a threshold. If the determination is yes, then a new network with the lowest cost is defined at Block 638. If the determination is no, then the method ends at Block 660.

As readily appreciated by those skilled in the art, the above flowchart may also be characterized as operating the controller 460 to select an antenna feed 412, 414, 416, configure the communications circuitry 420, and operate the positioner 442 to point the antenna 410 to a selected satellite all based upon the location of the ship and at least one selection rule.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A satellite communications terminal for a ship and comprising:
an antenna comprising three antenna feeds operable at respective different frequencies;
communications circuitry coupled to said three antenna feeds and being configurable for a selected antenna feed;
a positioner to mount said antenna to the ship and point said antenna; and a controller to select an antenna feed, configure said communications circuitry, and operate said positioner to point said antenna to a selected satellite all based upon the location of the ship and at least one selection rule, the at least one selection rule comprising at least one of a communications circuitry configuration rule and a service level agreement rule.

2. The satellite communications terminal according to claim 1 wherein the at least one selection rule is based upon at least one of communication speed, communication latency, and communication cost.

3. The satellite communications terminal according to claim 1 wherein said controller stores antenna pointing data for different satellite footprints and different ship locations, and operates said positioner according to the antenna pointing data.

4. The satellite communications terminal according to claim 1 wherein said controller selects the antenna feed, configures said communications circuitry, and operates said positioner also based upon at least one of a communications circuitry status and a time-of-day.

5. The satellite communications terminal according to claim 1 wherein said controller comprises a remote override interface to permit a remote station to override at least one of selection of the antenna feed, configuration of said communications circuitry, and pointing of said antenna.

6. The satellite communications terminal according to claim 1 wherein said antenna comprises a main reflector cooperating with said three antenna feeds, and a subreflector spaced from said main reflector.

7. The satellite communications terminal according to claim 1 wherein said three antenna feeds are operable at the Ka band, Ku band, and C band, respectively.

8. The satellite communications terminal according to claim 1 wherein said communications circuitry comprises:
a first transmitter and receiver pair associated with said first antenna feed;
a second transmitter and receiver pair associated with said second antenna feed; and
a third transmitter and receiver pair associated with said third antenna feed.

9. The satellite communications terminal according to claim 8 wherein said communications circuitry comprises:
a first modem associated with said first transmitter and receiver pair;
a second modem associated with said second transmitter and receiver pair; and
a third modem associated with said third transmitter and receiver pair.

10. The satellite communications terminal according to claim 9 wherein said communications circuitry comprises a router associated with said first, second and third modems.

11. The satellite communications terminal according to claim 1 wherein said positioner comprises a stabilization platform.

12. The satellite communications terminal according to claim 1 wherein said controller comprises a processor and a memory coupled thereto.

13. The satellite communications terminal according to claim 1 further comprising a radome surrounding said antenna.

14. A satellite communications terminal for a ship and comprising:
an antenna comprising three antenna feeds operable at respective different frequencies;
said antenna comprising a main reflector cooperating with said three antenna feeds, and a subreflector spaced from said main reflector;
communications circuitry coupled to said three antenna feeds and being configurable for a selected antenna feed;
a positioner to mount said antenna to the ship and point said antenna; and
a controller to select an antenna feed, configure said communications circuitry, and operate said positioner to point said antenna to a selected satellite all based upon the location of the ship and at least one selection rule, the at least one selection rule comprising at least one of a communications circuitry configuration rule and a service level agreement rule;
said controller comprising a processor and a memory coupled thereto.

15. The satellite communications terminal according to claim 14 wherein the at least one selection rule is based upon at least one of communication speed, communication latency, and communication cost.

16. The satellite communications terminal according to claim 14 wherein said controller stores antenna pointing data for different satellite footprints and different ship locations, and operates said positioner according to the antenna pointing data.

17. The satellite communications terminal according to claim 14 wherein said controller selects the antenna feed, configures said communications circuitry, and operates said positioner also based upon at least one of a communications circuitry status and a time-of-day.

18. The satellite communications terminal according to claim 14 wherein said controller comprises a remote override interface to permit a remote station to override at least one of selection of the antenna feed, configuration of said communications circuitry, and pointing of said antenna.

19. The satellite communications terminal according to claim 14 wherein said three antenna feeds are operable at the Ka band, Ku band, and C band, respectively.

20. The satellite communications terminal according to claim 14 wherein said communications circuitry comprises:
a first transmitter and receiver pair associated with said first antenna feed;
a second transmitter and receiver pair associated with said second antenna feed; and
a third transmitter and receiver pair associated with said third antenna feed.

21. The satellite communications terminal according to claim 20 wherein said communications circuitry comprises:
a first modem associated with said first transmitter and receiver pair;
a second modem associated with said second transmitter and receiver pair; and
a third modem associated with said third transmitter and receiver pair.

22. The satellite communications terminal according to claim 21 wherein said communications circuitry comprises a router associated with said first, second and third modems.

23. The satellite communications terminal according to claim 14 wherein said positioner comprises a stabilization platform.

24. A method for operating a satellite communications terminal for a ship comprising an antenna comprising three antenna feeds operable at respective different frequencies, communications circuitry coupled to the three antenna feeds and being configurable for a selected antenna feed, and a positioner to mount the antenna to the ship and point the antenna, the method comprising:
operating a controller to select an antenna feed, configure the communications circuitry, and operate the positioner to point the antenna to a selected satellite all based upon the location of the ship and at least one selection rule, the at least one selection rule comprising at least one of a communications circuitry configuration rule and a service level agreement rule.

25. The method according to claim 20 wherein the at least one selection rule is based upon at least one of communication speed, communication latency, and communication cost.

26. The method according to claim 20 comprising operating the controller to store antenna pointing data for different satellite footprints and different ship locations, and operate the positioner according to the antenna pointing data.

27. The method according to claim 20 comprising operating the controller to select the antenna feed, configure the communications circuitry, and operate the positioner also based upon at least one of a communications circuitry status and a time-of-day.

28. The method according to claim 20 comprising permitting a remote station to override at least one of selection of the antenna feed, configuration of the communications circuitry, and pointing of the antenna.

29. The method according to claim 20 wherein the antenna comprises a main reflector cooperating with the three antenna feeds, and a subreflector spaced from the main reflector; and wherein the three antenna feeds are operable at the Ka band, Ku band, and C band, respectively.

30. The method according to claim 20 wherein the controller comprises a processor and a memory coupled thereto.

31. A satellite communications terminal for a ship and comprising:
an antenna comprising three antenna feeds operable at respective different frequencies;
communications circuitry coupled to said three antenna feeds and being configurable for a selected antenna feed;
a positioner to mount said antenna to the ship and point said antenna; and
a controller to select an antenna feed, configure said communications circuitry, and operate said positioner to point said antenna to a selected satellite all based upon the location of the ship and at least one selection rule, said controller storing antenna pointing data for different satellite footprints and different ship locations, and operating said positioner according to the antenna pointing data.

32. The satellite communications terminal according to claim 31 wherein the at least one selection rule is based upon at least one of communication speed, communication latency, and communication cost.

33. The satellite communications terminal according to claim 31 wherein said controller selects the antenna feed, configures said communications circuitry, and operates said positioner also based upon at least one of a communications circuitry status and a time-of-day.

34. The satellite communications terminal according to claim 31 wherein said antenna comprises a main reflector cooperating with said three antenna feeds, and a subreflector spaced from said main reflector.

35. The satellite communications terminal according to claim 31 wherein said three antenna feeds are operable at the Ka band, Ku band, and C band, respectively.

36. A satellite communications terminal for a ship and comprising:
an antenna comprising three antenna feeds operable at respective different frequencies;
communications circuitry coupled to said three antenna feeds and being configurable for a selected antenna feed;
a positioner to mount said antenna to the ship and point said antenna; and
a controller to select an antenna feed, configure said communications circuitry, and operate said positioner to point said antenna to a selected satellite all based upon the location of the ship and at least one selection rule,
said controller comprising a remote override interface to permit a remote station to override at least one of selection of the antenna feed, configuration of said communications circuitry, and pointing of said antenna.

37. The satellite communications terminal according to claim 36 wherein the at least one selection rule is based upon at least one of communication speed, communication latency, and communication cost.

38. The satellite communications terminal according to claim 36 wherein said controller selects the antenna feed, configures said communications circuitry, and operates said positioner also based upon at least one of a communications circuitry status and a time-of-day.

39. The satellite communications terminal according to claim 36 wherein said antenna comprises a main reflector cooperating with said three antenna feeds, and a subreflector spaced from said main reflector.

40. The satellite communications terminal according to claim 36 wherein said three antenna feeds are operable at the Ka band, Ku band, and C band, respectively.

* * * * *

UNITED STATES PATENT AND TRADEMARK OFFICE
CERTIFICATE OF CORRECTION

PATENT NO. : 9,893,417 B2
APPLICATION NO. : 14/627421
DATED : February 13, 2018
INVENTOR(S) : Paleta, Jr. et al.

It is certified that error appears in the above-identified patent and that said Letters Patent is hereby corrected as shown below:

In the Claims

| | |
|---|---|
| Column 15, Line 10, Claim 25 | Delete: "20" Insert: --24-- |
| Column 15, Line 4, Claim 26 | Delete: "20" Insert: --24-- |
| Column 15, Line 19, Claim 27 | Delete: "20" Insert: --24-- |
| Column 15, Line 24, Claim 28 | Delete: "20" Insert: --24-- |
| Column 15, Line 28, Claim 29 | Delete: "20" Insert: --24-- |
| Column 15, Line 33, Claim 30 | Delete: "20" Insert: --24-- |

Signed and Sealed this
Seventeenth Day of April, 2018

Andrei Iancu
*Director of the United States Patent and Trademark Office*